(12) United States Patent
Emeott et al.

(10) Patent No.: US 12,701,625 B2
(45) Date of Patent: Aug. 4, 2026

(54) FORCING MOBILE DEVICE WIRELESS NETWORK RECONNECTION

(71) Applicant: Charter Communications Operating, LLC, St. Louis, MO (US)

(72) Inventors: Stephen Paul Emeott, Highlands Ranch, CO (US); Dileep Kumar Soma, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 378 days.

(21) Appl. No.: 18/446,893

(22) Filed: Aug. 9, 2023

(65) Prior Publication Data

US 2025/0056641 A1    Feb. 13, 2025

(51) Int. Cl.
*H04W 76/19* (2018.01)
*H04W 12/06* (2021.01)

(52) U.S. Cl.
CPC ......... *H04W 76/19* (2018.02); *H04W 12/068* (2021.01)

(58) Field of Classification Search
CPC ........................... H04W 76/19; H04W 12/068
See application file for complete search history.

(56) References Cited

U.S. PATENT DOCUMENTS

| | | | |
|---|---|---|---|
| 9,578,573 B2 * | 2/2017 | Srivastava | H04W 76/34 |
| 10,524,225 B1 * | 12/2019 | Boross | G01S 5/0295 |
| 11,368,994 B1 * | 6/2022 | Robinson | H04W 12/08 |
| 2013/0340046 A1 * | 12/2013 | Yu | H04W 12/06 |
| | | | 726/4 |
| 2015/0189567 A1 * | 7/2015 | Srivastava | H04W 36/302 |
| | | | 370/332 |
| 2016/0337243 A1 * | 11/2016 | Cui | H04W 40/22 |
| 2016/0345334 A1 * | 11/2016 | Veerepalli | H04H 20/38 |
| 2018/0124630 A1 * | 5/2018 | Ringland | H04W 8/183 |
| 2019/0335324 A1 * | 10/2019 | Ringland | H04L 61/5007 |
| 2019/0387396 A1 * | 12/2019 | Gui | H04W 76/14 |
| 2024/0163729 A1 * | 5/2024 | Ballew | H04W 12/04 |
| 2024/0214811 A1 * | 6/2024 | Golti | H04W 12/122 |

* cited by examiner

*Primary Examiner* — Melanie Jagannathan
(74) *Attorney, Agent, or Firm* — Dority & Manning, P.A.

(57) ABSTRACT

A wireless router that implements a first wireless network associated with a first service set identifier (SSID) and a second wireless network associated with a second SSID, determines that a mobile device connected to the first wireless network should be forced to attempt to reestablish a connection with the wireless router. In response to determining that the mobile device should be forced to attempt to reestablish the connection with the wireless router, the wireless router disables the first wireless network. The wireless router subsequently reenables the first wireless network.

20 Claims, 8 Drawing Sheets

FORCING MOBILE DEVICE WIRELESS NETWORK RECONNECTION

BACKGROUND

A mobile device may automatically connect to a wireless network implemented by a wireless router if the mobile device has previously connected to the wireless network. In some situations a wireless router may implement multiple wireless networks, and the mobile device may be capable of automatically connecting to more than one of such wireless networks.

SUMMARY

The embodiments disclosed herein implement mechanisms for forcing mobile device wireless network reconnection.

In one embodiment a method is provided. The method includes determining, by a wireless router that implements a first wireless network associated with a first service set identifier (SSID) and a second wireless network associated with a second SSID, that a mobile device connected to the first wireless network should be forced to attempt to reestablish a connection with the wireless router. The method further includes, in response to determining that the mobile device should be forced to attempt to reestablish the connection with the wireless router, disabling, by the wireless router, the first wireless network. The method further includes subsequently reenabling, by the wireless router, the first wireless network.

In another embodiment a wireless router is provided. The wireless router includes a memory, and a processor device coupled to the memory. The processor device is operable to implement a first wireless network associated with a first service set identifier (SSID) and a second wireless network associated with a second SSID. The processor device is further operable to determine that a mobile device connected to the first wireless network should be forced to attempt to reestablish a connection with the wireless router. The processor device is operable to, in response to determining that the mobile device should be forced to attempt to reestablish the connection with the wireless router, disable the first wireless network, and subsequently reenable the first wireless network.

In another embodiment a non-transitory computer-readable storage medium is provided. The non-transitory computer-readable storage medium includes executable instructions operable to cause a processor device of a wireless router to implement a first wireless network associated with a first service set identifier (SSID) and a second wireless network associated with a second SSID. The instructions are further operable to cause the processor device to determine that a mobile device connected to the first wireless network should be forced to attempt to reestablish a connection with the wireless router. The instructions are further operable to, in response to determining that the mobile device should be forced to attempt to reestablish the connection with the wireless router, disable the first wireless network. The instructions are further operable to subsequently reenable the first wireless network.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
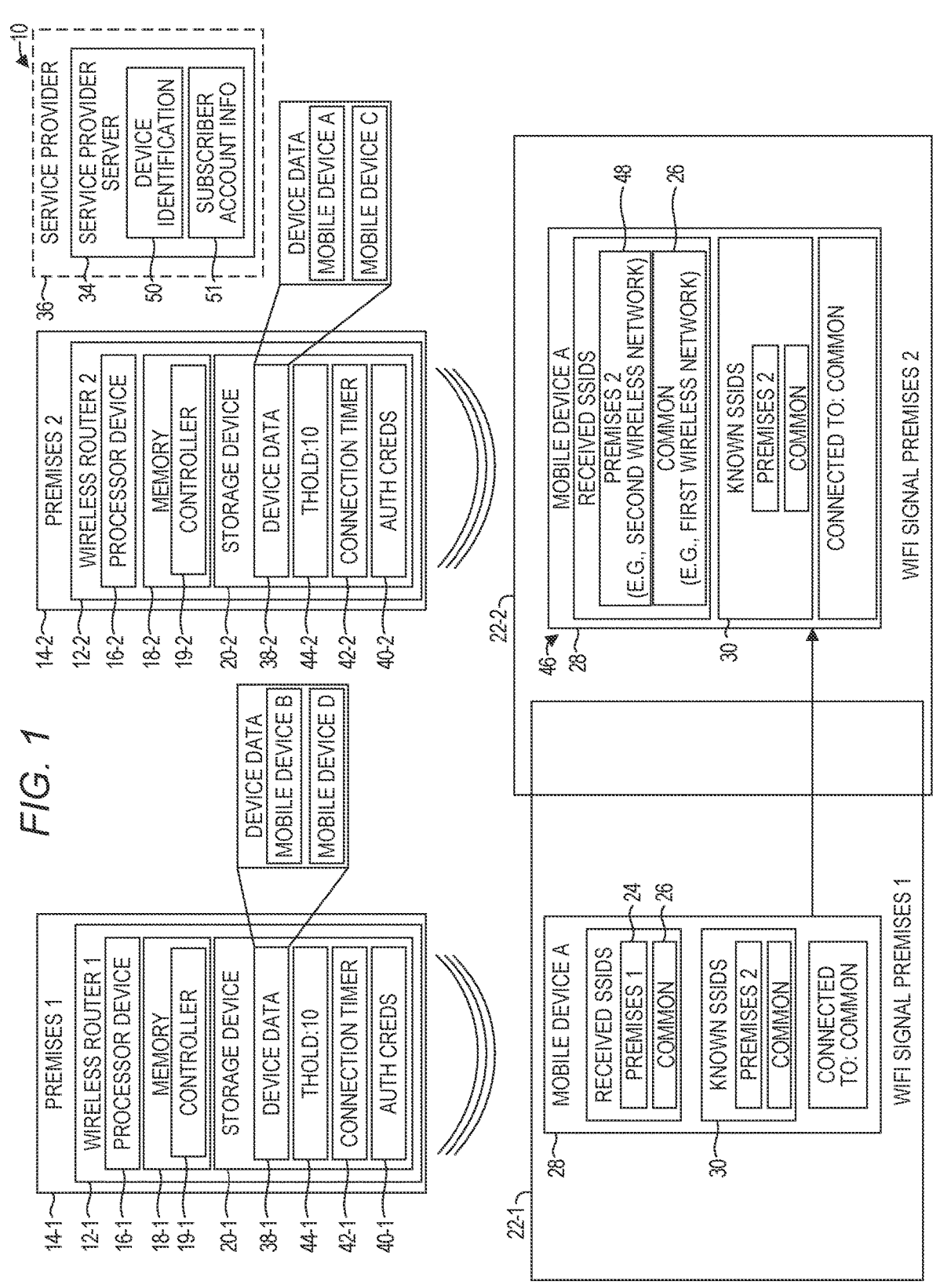
FIG. 1 is a block diagram of an environment in which mechanisms for forcing mobile device wireless network reconnection can be practiced according to some embodiments.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

A mobile device may automatically connect to a wireless network implemented by a wireless router if the mobile device has previously connected to the wireless network. The term "automatically" in this context means without human involvement. For example, the first time a mobile device attempts to join a wireless network, the mobile device may prompt the user for a password. After validating the credentials, the wireless router allows the mobile device to join the wireless network. The mobile device may subsequently be moved outside the range of the wireless network and disconnects from the wireless network. The mobile device may later come back within range of the wireless network and the wireless network may allow the mobile device to re-join the wireless network without prompting the user to reenter the password.

In some situations, a wireless router may implement multiple wireless networks, and the mobile device may be capable of automatically connecting to more than one of such wireless networks. The mobile device may automatically select one of the wireless networks, but it may be preferable if the mobile device had selected a different wireless network. As an example, a service provider may provision wireless routers with a public/common network service set identifier (SSID). The term SSID is used herein as such term is commonly used and may also be used synonymously with the term "wireless network" since a wireless network is typically known by the SSID associated with the wireless network. The public network may broadcast the same SSID from many or all wireless routers provided by the service provider to customers. The customers may also implement their own private networks via the wireless router, and thus the wireless router may implement both a "public" or common network and a "private network". The terms "public" and "common" are used synonymously herein and refer to a network that is offered by a plurality of different wireless routers, and which can automatically authenticate mobile devices that are authorized to use the common network.

A mobile device may connect to a common network offered by a first wireless router and then come within a stronger wireless range of a nearby second wireless router such that the mobile device determines it would be beneficial to move from the first wireless router to the second wireless router. The second wireless router may also implement the common network and implement a private network that the mobile device is capable of joining. The mobile device may select the common network over the private network for continuity purposes to stay on the same network, even though it may be desirable for the mobile device to join the private network rather than the common network. For example, the private network may offer higher speeds, implement stronger security, provide access to devices that are not available on the public network, or result in lower data costs than the data costs associated with the common network. In some implementations, it may also benefit a service provider to ensure that traffic that can be routed through the service provider's private network is indeed routed through the private network, rather than being routed through a public network.

One mechanism that could be employed to prevent this behavior in certain circumstances would be for a wireless router to blocklist certain mobile devices, such as mobile devices associated with a customer's account, or that recently connected to the private network of the wireless router. Unfortunately, blocklisting a mobile device often results in the mobile device initiating SSID blocking behavior, such that the mobile device will no longer attempt to join the common network, even if there is no other wireless network to join.

The embodiments disclosed herein implement mechanisms for forcing mobile device wireless network reconnection without causing mobile device SSID blocking behavior. In particular, a wireless router determines that a mobile device that has been connected to a first wireless network should be forced to attempt to reestablish a connection with the wireless router. The wireless router disables the first wireless network, while continuing to offer the second wireless network. In response, if capable of doing so, the mobile device automatically connects to the second wireless network. The wireless router may then subsequently reenable the first wireless network. In this manner the wireless router causes the mobile device to automatically move from the first wireless network to the second wireless network. The term "reestablish a connection" in this context means that the mobile device should be forced to attempt to join a wireless network implemented by the wireless router.

FIG. 1 is a block diagram of an environment 10 in which mechanisms for forcing mobile device wireless network reconnection can be practiced according to some embodiments. The environment 10 includes a wireless router 12-1 located in a premises 14-1. The premises 14-1 may comprise a house, a business, a government facility, or the like. In some embodiments the wireless router 12-1 may not be located in a premises and may be attached to a structure outside, such as pole or other structure. The wireless router 12-1 includes a processor device 16-1 and a memory 18-1. The memory 18-1 includes a controller 19-1 which may, in some embodiments, implement some or all of the functionality described herein with regard to the wireless router 12-1. The wireless router 12-1 may also include a storage device 20-1.

The wireless router 12-1, in this example, implements two wireless networks within a wireless area 22-1, a private wireless network 24 with an SSID "PREMISES 1" and a common wireless network 26 with an SSID "COMMON". In some embodiments the wireless router 12-1 may only implement the common wireless network. The common wireless network 26 may be a government provided network that is offered to any mobile device or may be a proprietary network that is provided to any mobile device that meets some criterion, such as being a subscriber of a particular service provider, or that has otherwise been provided authentication credentials to join the common wireless network 26.

A mobile device 28 enters the wireless area 22-1 and receives the broadcast of the SSIDs "COMMON" and "PREMISES 1". The mobile device 28 may be in the premises 14-1 or in sufficient proximity to the premises 14-1 such that the mobile device 28 receives the SSIDs. The mobile device 28, based on known SSIDs 30, determines that the mobile device 28 has previously connected to the network "COMMON", but not to the network "PREMISES 1".

The mobile device 28 thus automatically attempts to join the common wireless network 26. The wireless router 12-1 determines whether the mobile device 28 is permitted to join the common wireless network 26. This may involve determining that credentials that have been provided by the mobile device 28 are valid. In some embodiments, the wireless router 12-1 may provide information about the mobile device 28 to a service provider server 34 associated with a service provider 36. The service provider server 34 may, based on the information, determine that the mobile device 28 is associated with a subscriber of the service provider 36, and instruct the wireless router 12-1 to allow the mobile device 28 to join the common wireless network 26. The wireless router 12-1 allows the mobile device 28 to join the common wireless network 26. Upon joining the common wireless network 26, the mobile device 28 may be able to access services, such as Internet access, via the wireless router 12-1 and other devices in the service provider network of the service provider 36.

It may be preferable for the mobile device 28 to connect to the wireless network 24 if the mobile device 28 is capable of automatically doing so. Doing so may provide the mobile device 28 a greater bandwidth than is available on the common wireless network 26 and give the mobile device 28 access to other devices that are connected to the wireless network 24, such as storage devices, printers, media streaming devices, or the like. The storage device 20-1 maintains device data 38-1 that identifies mobile devices that have previously connected to the wireless network 24. In this example, it will be assumed that the mobile device 28 has not previously connected to the wireless network 24. The wireless router 12-1 may maintain authentication credentials 40-1 to authenticate mobile devices to one or both of the wireless networks 24 and 26. The wireless router 12-1 may also maintain a connection timer 42-1 for each mobile device that connects to the common wireless network 26 that is started upon a successful connection by a mobile device to the common wireless network 26. When the connection timer 42-1 for any mobile device connected to the common wireless network 26 exceeds a threshold period of time 44-1, the wireless router 12-1 may initiate a mechanism to force the mobile devices connected to the common wireless network 26 to attempt to reestablish the connection with the wireless router 12-1, as will be explained in greater detail below with regard to a wireless router 12-2.

For purposes of illustration assume that prior to the connection timer 42-1 exceeding the threshold period of time 44-1, the mobile device 28 moves to a location 46 that is within a wireless range 22-2 of the wireless router 12-2. The wireless router 12-2 is maintained in a premises 14-2. The wireless router 12-2 includes a processor device 16-2, a memory 18-2, a controller 19-2 and a storage device 20-2. The wireless router 12-2 implements two wireless networks within the wireless area 22-2, a wireless network 48 with an SSID "PREMISES 2" and the common wireless network 26 with the SSID "COMMON".

The mobile device 28 recognizes the common wireless network 26 as a network that the mobile device 28 has previously connected to, and also recognizes the wireless network 48. It would be preferable in this example for the mobile device 28 to automatically connect to the wireless network 48. This may be because connecting to the wireless network 48 may allow the mobile device 28 to access other devices connected to the wireless network 48, because the wireless network 48 may have a greater bandwidth and/or priority than the common wireless network 26, or due to reasons not directly related to the mobile device 28, such as it may be preferable to the service provider 36 that mobile devices 28 move off of the common network 26 when possible.

However, the mobile device network selection mechanism may prioritize staying on a same network when moving from one wireless router to another wireless router. Thus, in this example, the mobile device network selection mechanism of the mobile device 28 causes the mobile device 28 to automatically join the common wireless network 26. In this example, the wireless router 12-2 may use one or more mechanisms to determine that the mobile device 28 should be forced to reestablish a connection with the wireless router 12-2 in an attempt to cause the mobile device 28 to connect to the wireless network 48. One such mechanism is for the wireless router 12-2 to start a connection timer 42-2 when the mobile device 28 connects to the common wireless network 26. When the connection timer 42-2 indicates that the mobile device 28 has been connected to the common network 26 greater than a threshold period of time 44-2, the wireless router 12-2 may initiate a mechanism to force the mobile devices connected to the common wireless network 26 to attempt to reestablish a connection with the wireless router 12-2.

Another mechanism may be to determine whether the mobile device 28 has previously connected to the wireless network 48. In particular, the wireless router 12-2 may maintain device data 44-2 that maintains information that identifies mobile devices that have connected to the wireless network 48 in the past. In some embodiments, the information may comprise Media Access Control (MAC) addresses of the mobile devices. The wireless router 12-2 may then compare the MAC address of the mobile device 28 to the MAC addresses maintained in the device data 44-2, and if there is a match, the wireless router 12-2 may initiate a mechanism to force the mobile devices connected to the common wireless network 26 to attempt to reestablish a connection with the wireless router 12-2.

In other embodiments, particularly where MAC randomization may be a concern, the wireless router 12-2 may utilize a device identification technology, such as, by way of non-limiting example, a device identification technology offered by Cujo LLC, available at cujo.com, or Levl, available at levl.tech, each of which generates a device fingerprint of a device based on characteristics of the device and/or behavioral patterns of the device. In particular, when a mobile device joins the wireless network 48, the wireless router 12-2 provides information about the mobile device to a device identification module 50 executing on the service provider server 34. The device identification module 50 generates a fingerprint of the device and sends the fingerprint to the wireless router 12-2. The wireless router 12-2 stores the fingerprint in the device data 38-2. Subsequently, after the mobile device 28 joins the common wireless network 26, the wireless router 12-2 provides information about the mobile device 28 to the device identification module 50. The device identification module 50 generates a fingerprint of the device and sends the fingerprint to the wireless router 12-2. The wireless router 12-2 may then compare the device fingerprint of the mobile device 28 to the device fingerprints maintained in the device data 44-2, and if there is a match, the wireless router 12-2 may initiate a mechanism to force the mobile devices connected to the common wireless network 26 to attempt to reestablish a connection with the wireless router 12-2.

In another embodiment, when the mobile device 28 joins the common wireless network 26, the wireless router 12-2 provides information about the mobile device 28 to the service provider server 34. The service provider server 34 accesses subscriber account information 51 and determines that the mobile device 28 is registered to an account associated with the wireless router 12-2. The service provider server 34 then informs the wireless router 12-2 that the mobile device 28 is associated with the same account as the wireless router 12-2. In response, the wireless router 12-2 may initiate a mechanism to force the mobile devices connected to the common wireless network 26 to attempt to reestablish a connection with the wireless router 12-2.

In response to determining that the mobile device 28 should be forced to attempt to reestablish a connection with the wireless router 12-2 to thereby connect to the wireless network 48 instead of the common network 26, the wireless router 12-2 may disable the common wireless network 26 for a period of time. In particular, the wireless router 12-2 may inhibit broadcasting of the SSID "COMMON" and inhibit responding to any requests (e.g., transmissions) of the mobile device 28. After a period of time, the mobile device 28 concludes that the mobile device 28 is no longer connected to the common wireless network 26. In response, the mobile device 28 determines the SSIDs that are currently being broadcasted within range of the mobile device 28. Because the wireless router has inhibited broadcasting the SSID "COMMON" but continued to broadcast the SSID "PREMISES 2", the mobile device 28 determines that the wireless network 48 is available to join. The mobile device 28 accesses the known SSIDs 30 and determines that the mobile device 28 has previously connected to the wireless network 48. The mobile device 28 sends a request to the wireless router 12-2 to join (e.g., connect to) the wireless network 48, and provides authentication credentials to the wireless router 12-2. The wireless router 12-2 may access authentication credentials 40-2 that identify what authentication is required to join the wireless network 48 and determine that the mobile device 28 has provided valid authentication credentials. The wireless router 12-2 then allows the mobile device 28 to connect to the wireless network 48.

The wireless router 12-2 may subsequently reenable the common wireless network 26 by restarting the broadcasting of the SSID "COMMON" and responding to any mobile devices that request to join the common wireless network 26. The wireless router 12-2 may reenable the common wireless network 26 after a predetermined period of time, such as 10 seconds, 20 seconds, or the like.

Figure 2:
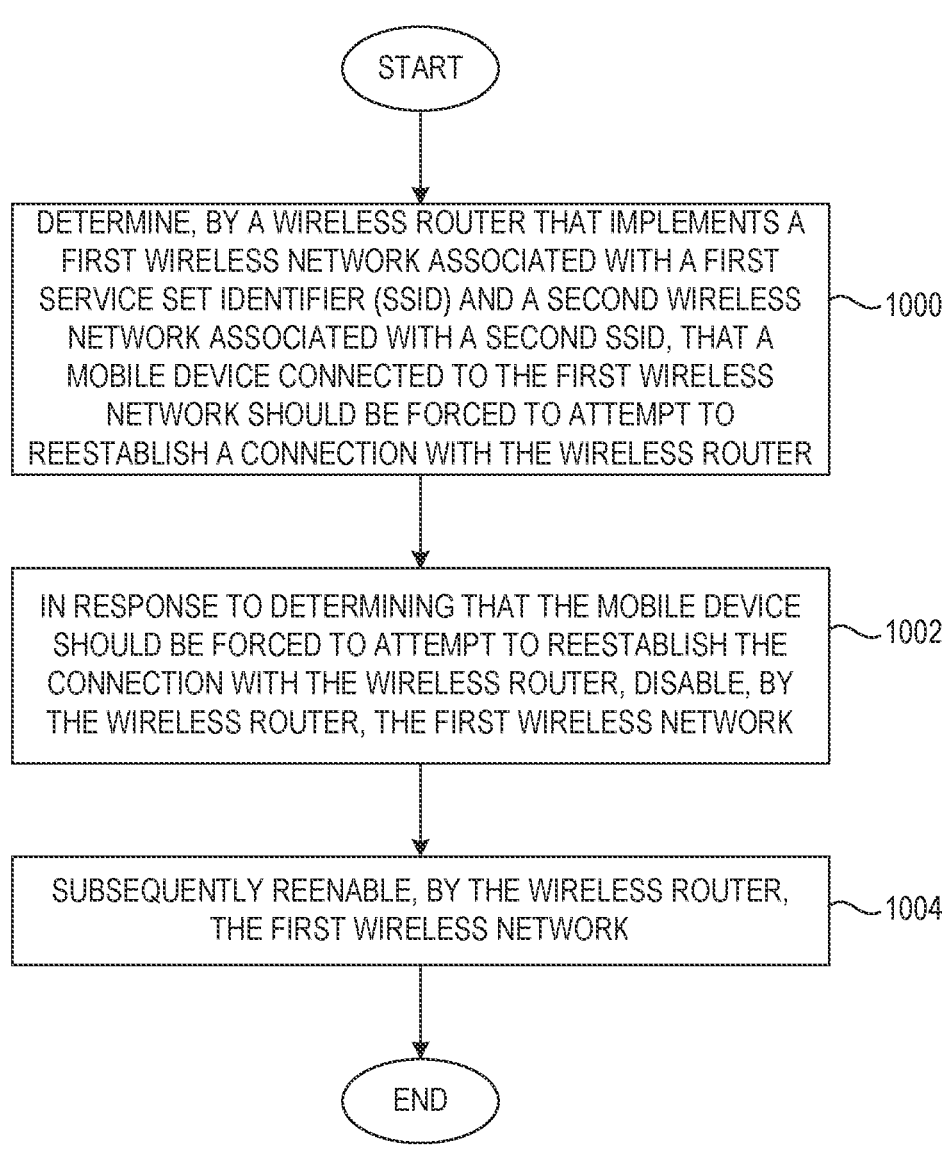
FIG. 2 is a flowchart of a method for forcing mobile device wireless network reconnection according to some embodiments.

FIG. 2 is a flowchart of a method for forcing mobile device wireless network reconnection according to some embodiments. FIG. 2 will be discussed in conjunction with FIG. 1. The wireless router 12-2, which implements the first wireless network 26 associated with the service set identifier (SSID) "COMMON" and the second wireless network 48 associated with the SSID "PREMISES 2", determines that the mobile device 28 connected to the first wireless network 26 should be forced to attempt to reestablish a connection with the wireless router 12-2 (FIG. 2, block 1000). The wireless router 12-2, in response to determining that the mobile device 28 should be forced to attempt to reestablish the connection with the wireless router, disables the first wireless network 26 (FIG. 2, block 1002). The wireless router 12-2 subsequently reenables the first wireless network 26 (FIG. 2, block 1004).

Figure 3A:
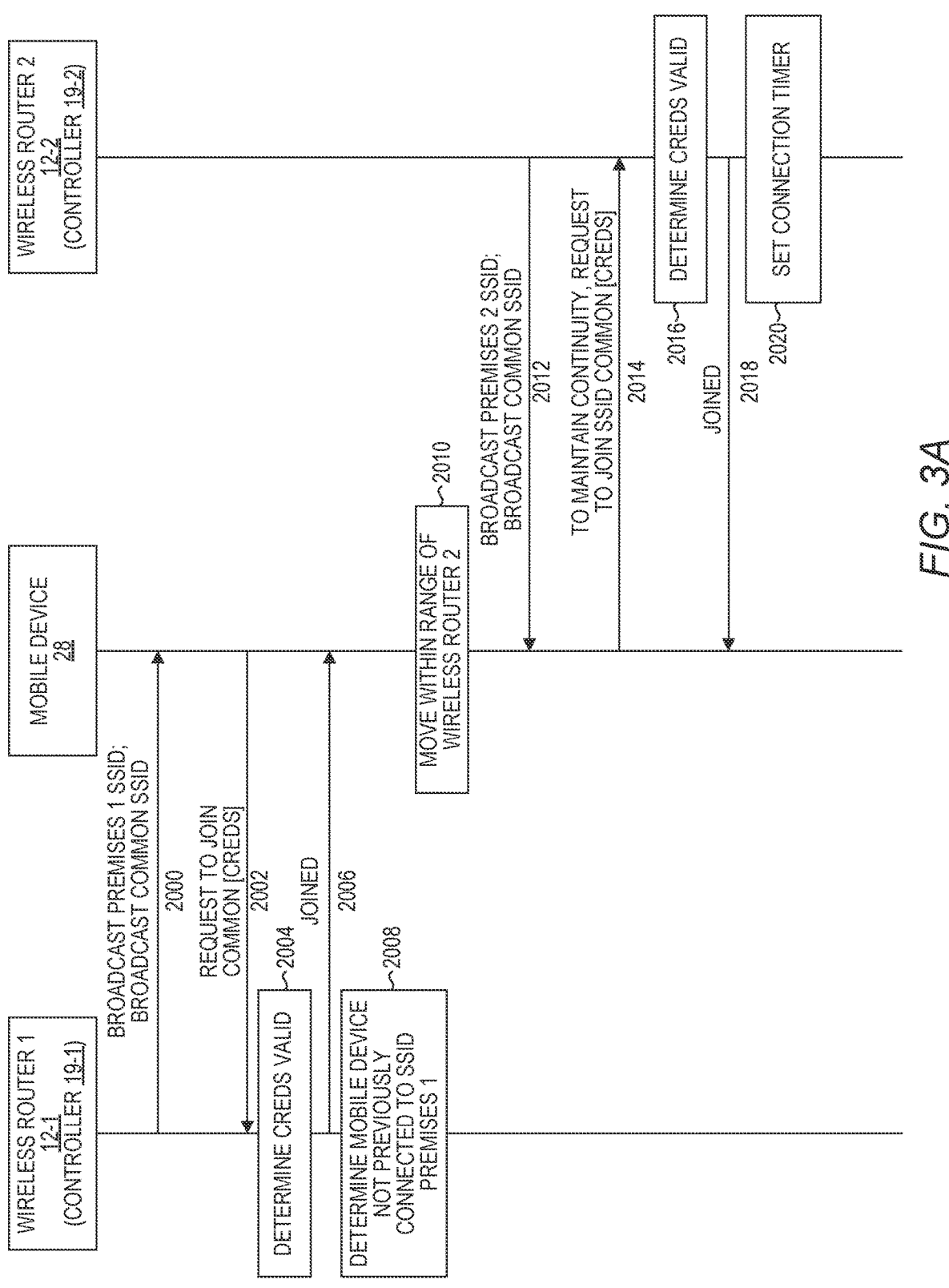
FIGS. 3A-3B are a sequence diagram illustrating actions taken by and messages communicated between various components illustrated in FIG. 1 to implement mechanisms for forcing mobile device wireless network reconnection according to some embodiments.
Figure 3B:

FIGS. 3A-3B are a sequence diagram illustrating actions taken by and messages communicated between various components illustrated in FIG. 1 to implement mechanisms for forcing mobile device wireless network reconnection according to some embodiments. Referring to FIG. 3A, the controller 19-1 broadcasts the "PREMISES 1" SSID and the "COMMON" SSID (FIG. 3A, block 2000). The mobile device 28 recognizes the "COMMON" SSID and sends a join request to the wireless router 12-1 along with authentication credentials (FIG. 3A, block 2002). The controller 19-1 determines that the authentication credentials are valid (FIG. 3A, block 2004). The controller 19-1 sends a message to the mobile device 28 indicating that the mobile device 28 is successfully connected to the wireless network "COMMON" (FIG. 3A, block 2006). The controller 19-1 determines that the mobile device 28 has not previously joined the wireless network "PREMISES 1", and thus does not initiate a mechanism to force the mobile device 28 to attempt to reestablish a connection with the wireless router 12-1 (FIG. 3A, block 2008).

The mobile device 28 moves within wireless range of the wireless router 12-2 (FIG. 3A, block 2010). The controller 19-2 continuously broadcasts the "PREMISES 2" SSID and the "COMMON" SSID (FIG. 3A, block 2012). The mobile device 28 determines that the mobile device 28 has previously joined both the "PREMISES 2" network and the "COMMON" network, but to maintain network continuity, sends a request to the wireless router 12-2 to join the "COMMON" network (FIG. 3A, block 2014). The controller 19-2 determines that the authentication credentials are valid and sends a message to the mobile device 28 indicating that the mobile device 28 is successfully connected to the wireless network "COMMON" (FIG. 3A, blocks 2016, 2018).

The controller 19-2 sets the connection timer 42-2 (FIG. 3A, block 2020). Referring now to FIG. 3B, the connection timer 42-2 expires (FIG. 3B, block 2022). In response to the connection timer 42-2 expiring, the controller 19-2 disables the wireless network "COMMON" by stopping the broadcasting of the SSID "COMMON", and by no longer responding to the mobile device 28 (FIG. 3B, block 2024). The controller 19-2 continues to broadcast the SSID "PREMISES 2" (FIG. 3B, block 2026). The mobile device 28 determines that the wireless router 12-2 is no longer responding (FIG. 3B, block 2028). The mobile device 28 determines that the "PREMISES 2" network is available and that the mobile device 28 has previously joined the "PREMISES 2" network (FIG. 3B, block 2030). The mobile device 28, without human involvement, sends a join request to the wireless router 12-2 along with authentication credentials (FIG. 3B, block 2032). The controller 19-2 determines that the authentication credentials are valid (FIG. 3B, block 2034). The controller 19-2 sends a message to the mobile device 28 indicating that the mobile device 28 is successfully connected to the wireless network "PREMISES 2" (FIG. 3B, block 2036). The controller 19-2 subsequently begins to rebroadcast the SSID "COMMON" (FIG. 3B, block 2038).

Figure 4A:
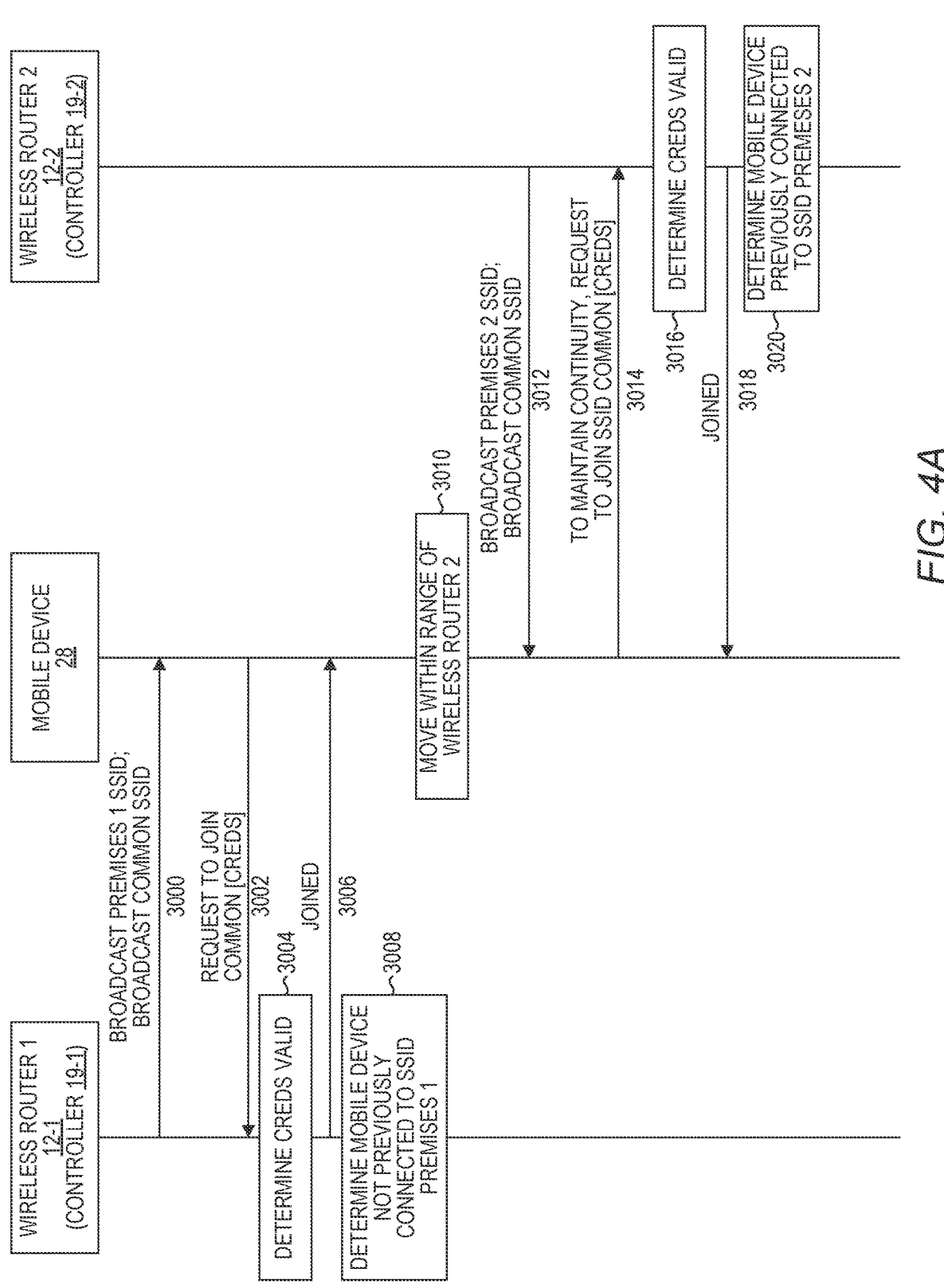
FIGS. 4A-4B are a sequence diagram illustrating actions taken by and messages communicated between various components illustrated in FIG. 1 to implement mechanisms for forcing mobile device wireless network reconnection according to other embodiments.
Figure 4B:
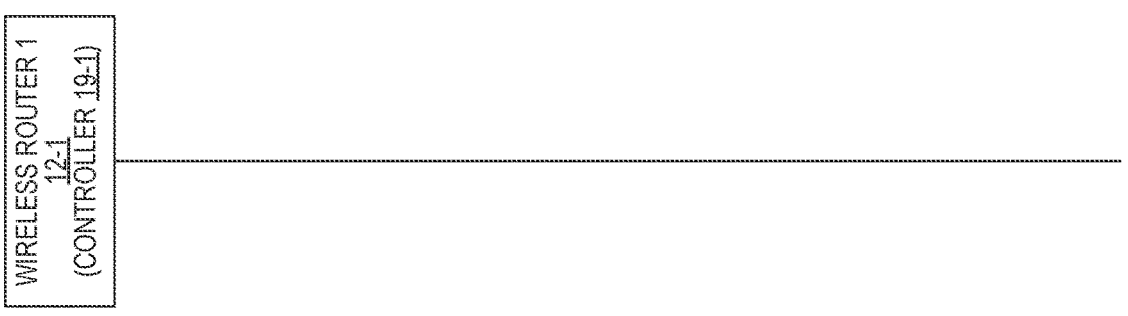

FIGS. 4A-4B are a sequence diagram illustrating actions taken by and messages communicated between various components illustrated in FIG. 1 to implement mechanisms for forcing mobile device wireless network reconnection according to other embodiments. Referring to FIG. 4A, the controller 19-1 broadcasts the "PREMISES 1" SSID and the "COMMON" SSID (FIG. 4A, block 3000). The mobile device 28 recognizes the "COMMON" SSID and sends a join request to the wireless router 12-1 along with authentication credentials (FIG. 4A, block 3002). The controller 19-1 determines that the authentication credentials are valid (FIG. 4A, block 3004). The controller 19-1 sends a message to the mobile device 28 indicating that the mobile device 28 is successfully connected to the wireless network "COMMON" (FIG. 4A, block 3006). The controller 19-1 determines that the mobile device 28 has not previously joined the wireless network "PREMISES 1", and thus does not initiate a mechanism to force the mobile device 28 to attempt to reestablish a connection with the wireless router 12-1 (FIG. 4A, block 3008).

The mobile device 28 moves within wireless range of the wireless router 12-2 (FIG. 4A, block 3010). The controller 19-2 continuously broadcasts the "PREMISES 2" SSID and the "COMMON" SSID (FIG. 4A, block 3012). The mobile device 28 determines that the mobile device 28 has previously joined both the "PREMISES 2" network and the "COMMON" network, but to maintain network continuity, sends a request to the wireless router 12-2 to join the "COMMON" network (FIG. 4A, block 3014). The controller 19-2 determines that the authentication credentials are valid and sends a message to the mobile device 28 indicating that the mobile device 28 is successfully connected to the wireless network "COMMON" (FIG. 4A, blocks 3016, 3018).

The controller 19-2 determines that the mobile device 28 has previously joined the wireless network "PREMISES 2", and thus decides to initiate a mechanism to force the mobile device 28 to attempt to reestablish a connection with the wireless router 12-2 (FIG. 4A, block 3020).

Referring now to FIG. 4B, the controller 19-2 disables the wireless network "COMMON" by stopping the broadcasting of the SSID "COMMON", and by no longer responding to the mobile device 28 (FIG. 4B, block 3022). The controller 19-2 continues to broadcast the SSID "PREMISES 2" (FIG. 4B, block 3024). The mobile device 28 determines that the wireless router 12-2 is no longer responding (FIG. 4B, block 3026). The mobile device 28 determines that the "PREMISES 2" network is available and that the mobile device 28 has previously joined the "PREMISES 2" network (FIG. 4B, block 3028). The mobile device 28, without human involvement, sends a join request to the wireless router 12-2 along with authentication credentials (FIG. 4B, block 3030). The controller 19-2 determines that the authentication credentials are valid (FIG. 4B, block 3032). The controller 19-2 sends a message to the mobile device 28 indicating that the mobile device 28 is successfully connected to the wireless network "PREMISES 2" (FIG. 4B, block 3034). The controller 19-2 subsequently begins to rebroadcast the SSID "COMMON" (FIG. 4B, block 3036).

It is noted that, because the controller 19-2 is a component of the wireless router 12-2, functionality implemented by the controller 19-2 may be attributed to the wireless router 12-2 generally. Moreover, in examples where the controller 19-2 comprises software instructions that program the processor device 16-2 to carry out functionality discussed herein, functionality implemented by the controller 19-2 may be attributed herein to the processor device 16-2.

In an alternate embodiment, the wireless router 12-2 may periodically force all mobile devices attached to the COMMON network to attempt to reestablish a connection with the wireless router 12-2. For example, every 10 minutes, 30 minutes, or any other suitable period of time, the wireless router 12-2 may disable the COMMON network, as described above. After a predetermined period of time, the wireless router 12-2 may reenable the COMMON network. Any such mobile devices that are capable of connecting with the PREMISES 2 network will attempt to join the PREMISES 2 after being disconnected from the COMMON network. This embodiment eliminates a need to maintain track of which mobile devices previously connected to the PREMISES 2 network and/or the need to maintain the connection timer 42-2 for individual mobile devices.

Figure 5:
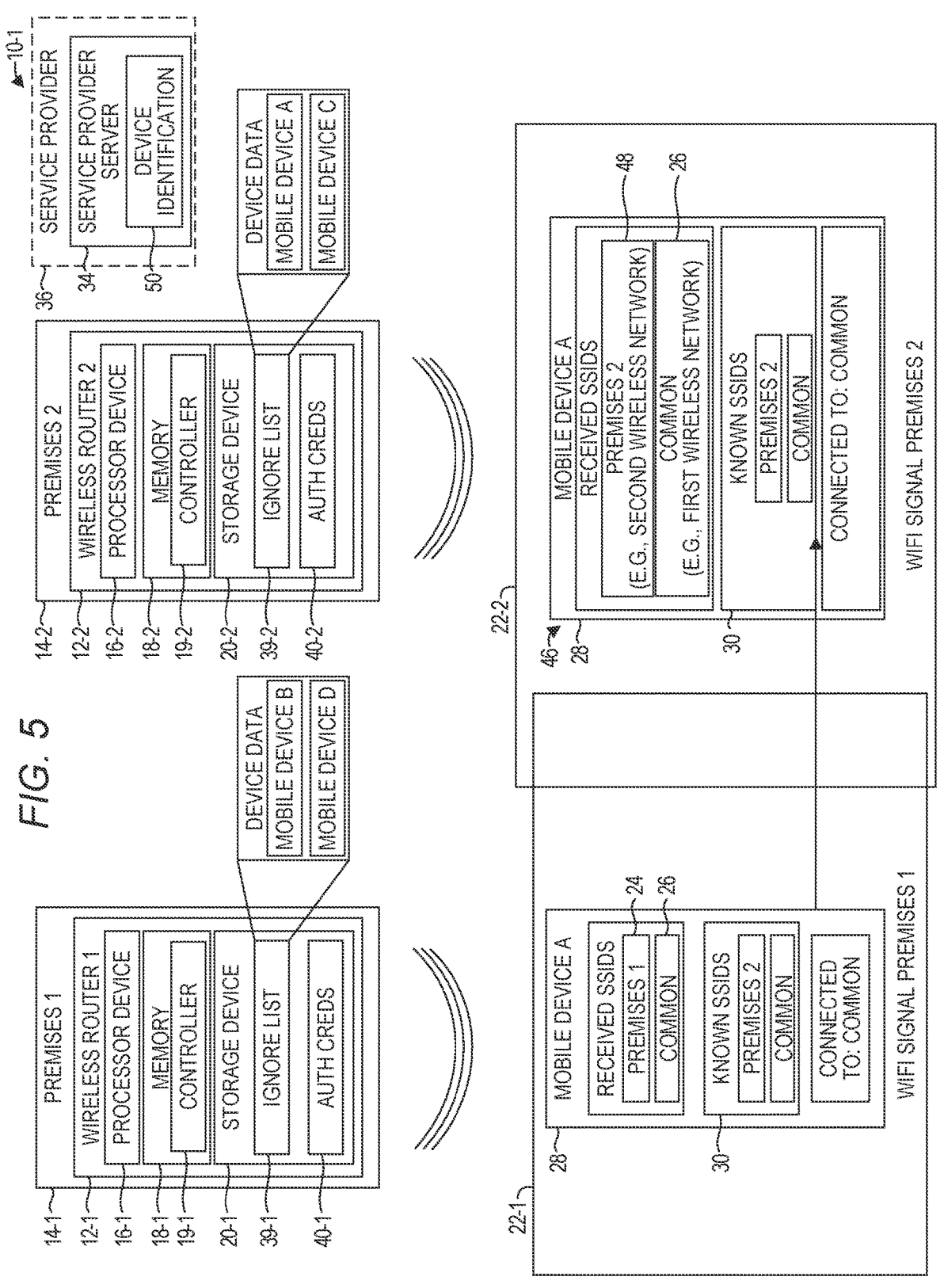
FIG. 5 is a block diagram of an environment according to another implementation.

FIG. 5 is a block diagram of an environment 10-1 according to another implementation. The environment 10-1 is substantially similar to the environment 10 except as otherwise discussed herein. In this example, the wireless routers 12-1 and 12-2 maintain ignore lists 39-1, 39-2 respectively, which identify mobile devices that the wireless routers 12-1 and 12-2 know have connected to the private networks 24, 48 respectively. This may be determined, as discussed above, either through MAC identification or a device fingerprinting mechanism that identifies devices that have previously connected to the private networks 24, 48. In this example, the mobile device 28 moves to the location 46 that is within the wireless range 22-2 of the wireless router 12-2. The mobile device 28 recognizes the common wireless network 26 as a network that the mobile device 28 has previously connected to, and also recognizes the wireless network 48. Again, the mobile device network selection mechanism may prioritize staying on a same network when moving from one wireless router to another wireless router.

Thus, in this example, the mobile device network selection mechanism of the mobile device 28 causes the mobile device 28 to attempt to join the common wireless network 26. In this example, the wireless router 12-2 accesses the ignore list 39-2 and determines that the mobile device 28 is on the ignore list 39-2. In response, the wireless router 12-2 does not respond to the mobile device 28. The mobile device 28 may attempt to join the common wireless network 26 a predetermined number of times before giving up. The mobile device 28 may then automatically join the private network 48. Note that ignoring the mobile device 28 (e.g., not responding to the mobile device 28) will not initiate future SSID blocking behavior of the mobile device 28.

Figure 6:
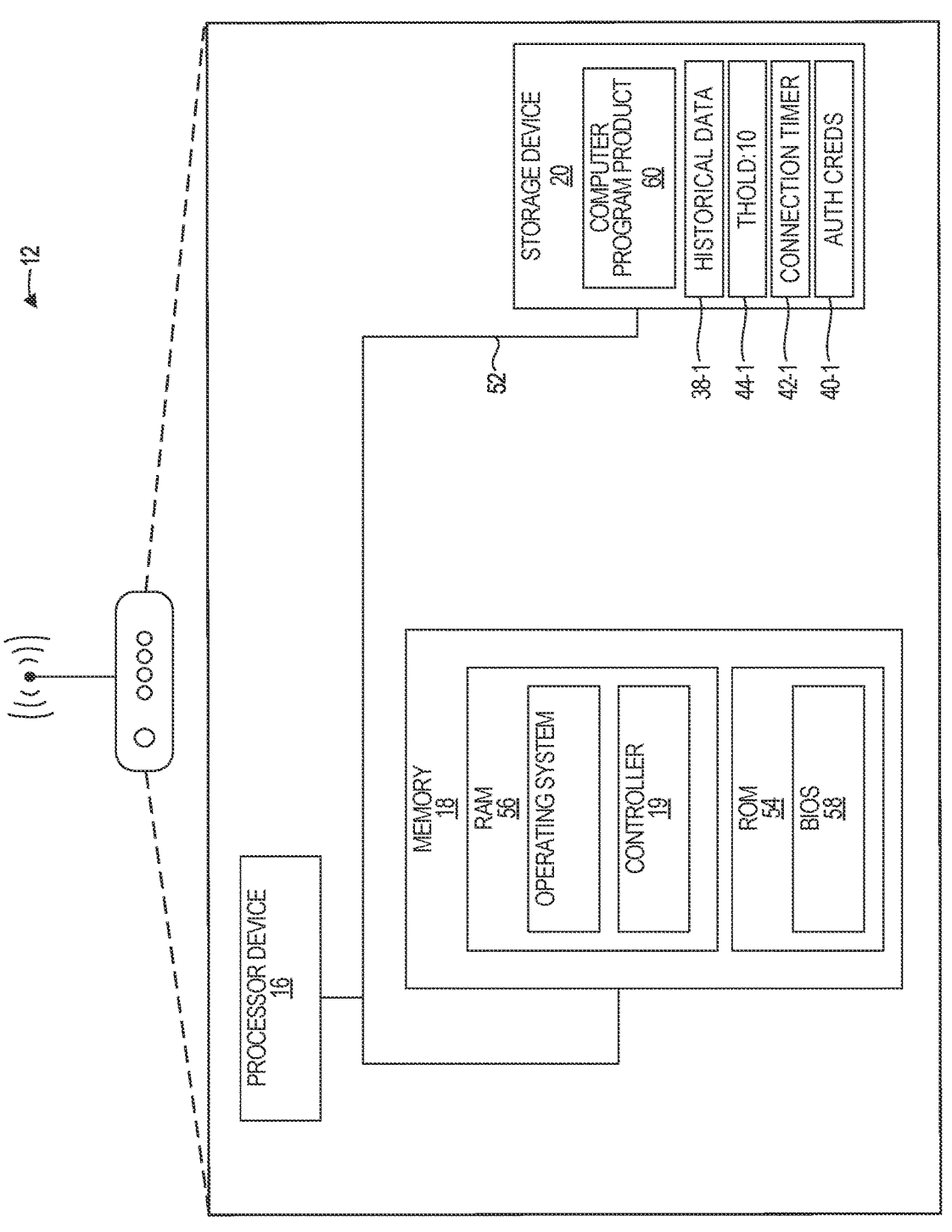
FIG. 6 is a block diagram of a wireless router suitable for implementing the embodiments disclosed herein.

FIG. 6 is a block diagram of a wireless router 12 according to one embodiment that implements identical functionality to the wireless routers 12-1 and 12-2. The wireless router 12 includes a processor device 16, a system memory 18, and a system bus 52. The system bus 52 provides an interface for system components including, but not limited to, the system memory 18 and the processor device 16. The processor device 16 can be any commercially available or proprietary processor device.

The system bus 52 may be any of several types of bus structures that may further interconnect to a memory bus (with or without a memory controller), a peripheral bus, and/or a local bus using any of a variety of commercially available bus architectures. The system memory 18 may include non-volatile memory 54 (e.g., read-only memory (ROM), erasable programmable read-only memory (EPROM), electrically erasable programmable read-only memory (EEPROM), etc.), and volatile memory 56 (e.g., random-access memory (RAM)). A basic input/output system (BIOS) 58 may be stored in the non-volatile memory 54 and can include the basic routines that help to transfer information between elements within the wireless router 12. The volatile memory 56 may also include a high-speed RAM, such as static RAM, for caching data.

The wireless router 12 may further include or be coupled to a non-transitory computer-readable storage medium such as the storage device 20, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 20 and other drives associated with computer-readable media and computer-usable media may provide non-volatile storage of data, data structures, computer-executable instructions, and the like. A number of modules can be stored in the storage device 20 and in the volatile memory 56, including an operating system and one or more program modules, such as the controller 19, which may implement the functionality described herein in whole or in part. All or a portion of the examples may be implemented as a computer program product 60 stored on a transitory or non-transitory computer-usable or computer-readable storage medium, such as the storage device 20, which includes complex programming instructions, such as complex computer-readable program code, to cause the processor device 16 to carry out the steps described herein. Thus, the computer-readable program code can comprise software instructions for implementing the functionality of the examples described herein when executed on the processor device 16. The processor device 16, in conjunction with the controller 19 in the volatile memory 56, may serve as a controller, or control system, for the wireless router 12 that is to implement the functionality described herein.

Individuals will recognize improvements and modifications to the preferred examples of the disclosure. All such improvements and modifications are considered within the scope of the concepts disclosed herein and the claims that follow.

What is claimed is:

1. A method comprising:

determining, by a wireless router that implements a first wireless network associated with a first service set identifier (SSID) and a second wireless network associated with a second SSID, that a mobile device connected to the first wireless network should be forced to attempt to reestablish a connection with the wireless router;

in response to determining that the mobile device should be forced to attempt to reestablish the connection with the wireless router, disabling, by the wireless router, the first wireless network; and subsequently reenabling, by the wireless router, the first wireless network.

2. The method of claim 1 wherein determining that the mobile device should be forced to attempt to reestablish the connection with the wireless router comprises:

accessing device data identifying one or more mobile devices that have previously connected to the second wireless network; and determining that the mobile device is one of the one or more mobile devices.

3. The method of claim 1 wherein determining that the mobile device should be forced to attempt to reestablish the connection with the wireless router comprises:

accessing device data comprising a plurality of Media Access Control (MAC) addresses of mobile devices that are capable of automatically connecting to the second wireless network;

determining a MAC address of the mobile device; and determining that the MAC address of the mobile device matches a MAC address in the device data.

4. The method of claim 1 wherein determining that the mobile device should be forced to attempt to reestablish the connection with the wireless router comprises:

determining that the mobile device has been connected to the first wireless network for a period of time greater than a threshold period of time.

5. The method of claim 1 wherein determining that the mobile device should be forced to attempt to reestablish the connection with the wireless router comprises:

determining, by the wireless router, that the mobile device is registered to a same account as an account to which the wireless router is registered.

6. The method of claim 5 wherein determining that the mobile device is registered to the same account as the account to which the wireless router is registered further comprises:

sending, by the wireless router to a service provider server, information identifying the mobile device; and receiving, by the wireless router from the service provider server, information indicating that the mobile device is registered to the same account as the account to which the wireless router is registered.

7. The method of claim 1 wherein the first wireless network is implemented on a plurality of wireless routers that broadcast a same SSID, and the second wireless network is a private wireless network that requires authentication credentials to join the private wireless network.

8. The method of claim 1 wherein disabling, by the wireless router, the first wireless network comprises:

inhibiting broadcasting the first SSID associated with the first wireless network; and inhibiting responding to any requests of any mobile device connected to the first wireless network.

9. The method of claim 1 wherein reenabling, by the wireless router, the first wireless network comprises rebroadcasting the first SSID associated with the first wireless network.

10. The method of claim 1 further comprising, prior to determining that the mobile device should be forced to attempt to reestablish the connection with the wireless router, receiving, by the wireless router, a request from the mobile device to join the first wireless network; and in response to the request, allowing the mobile device to connect to the first wireless network.

11. The method of claim 1 further comprising:

subsequent to disabling the first wireless network and prior to reenabling the first wireless network, receiving, by the wireless router, a request from the mobile device to join the second wireless network;

receiving, by the wireless router, authentication credentials from the mobile device;

determining, by the wireless router, that the authentication credentials are valid; and in response to determining that the authentication credentials are valid, allowing the mobile device to connect to the second wireless network.

12. The method of claim 1 wherein subsequently reenabling, by the wireless router, the first wireless network comprises subsequently reenabling, by the wireless router, the first wireless network after a predetermined period of time.

13. The method of claim 1, further comprising:

subsequent to disabling the first wireless network and prior to reenabling the first wireless network, receiving, by the wireless router, a request from the mobile device to join the second wireless network.

14. A wireless router, comprising:

a memory; and a processor device coupled to the memory and operable to:

implement a first wireless network associated with a first service set identifier (SSID) and a second wireless network associated with a second SSID;

determine that a mobile device connected to the first wireless network should be forced to attempt to reestablish a connection with the wireless router;

in response to determining that the mobile device should be forced to attempt to reestablish the connection with the wireless router, disable the first wireless network; and subsequently reenable the first wireless network.

15. The wireless router of claim 14 wherein, to determine that the mobile device should be forced to attempt to reestablish the connection with the wireless router, the processor device is further operable to:

access device data identifying one or more mobile devices that have previously connected to the second wireless network; and determine that the mobile device is one of the one or more mobile devices.

16. The wireless router of claim 14 wherein, to determine that the mobile device should be forced to attempt to reestablish the connection with the wireless router, the processor device is further operable to:

determine that the mobile device has been connected to the first wireless network for a period of time greater than a threshold period of time.

17. The wireless router of claim 14 wherein, to disable the first wireless network, the processor device is further operable to:

inhibit broadcasting the first SSID associated with the first wireless network; and inhibit responding to any requests of any mobile device connected to the first wireless network.

18. The wireless router of claim 14 wherein the processor device is further operable to, prior to determining that the mobile device should be forced to attempt to reestablish the connection with the wireless router, receive a request from the mobile device to join the first wireless network; and in response to the request, allow the mobile device to connect to the first wireless network.

19. A non-transitory computer-readable storage medium that includes executable instructions operable to cause a processor device of a wireless router to:

implement a first wireless network associated with a first service set identifier (SSID) and a second wireless network associated with a second SSID;

determine that a mobile device connected to the first wireless network should be forced to attempt to reestablish a connection with the wireless router;

in response to determining that the mobile device should be forced to attempt to reestablish the connection with the wireless router, disable the first wireless network; and subsequently reenable the first wireless network.

20. The non-transitory computer-readable storage medium of claim 19 wherein, to determine that the mobile device should be forced to attempt to reestablish the connection with the wireless router, the instructions are further operable to cause the processor device to:

access device data identifying one or more mobile devices that have previously connected to the second wireless network; and determine that the mobile device is one of the one or more mobile devices.

* * * * *